United States Patent
Blacquiere et al.

(10) Patent No.: US 7,152,197 B2
(45) Date of Patent: Dec. 19, 2006

(54) ERROR CORRECTION OF STREAM DATA

(75) Inventors: Johannis Frisco Rendert Blacquiere, Eindhoven (NL); Ronald Marcel Tol, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 157 days.

(21) Appl. No.: 10/502,141

(22) PCT Filed: Dec. 20, 2002

(86) PCT No.: PCT/IB02/05657

§ 371 (c)(1),
(2), (4) Date: Jul. 20, 2004

(87) PCT Pub. No.: WO03/063496

PCT Pub. Date: Jul. 31, 2003

(65) Prior Publication Data

US 2005/0071724 A1    Mar. 31, 2005

(30) Foreign Application Priority Data

Jan. 24, 2002    (EP)    .................... 02075300

(51) Int. Cl.
*H03M 13/00*    (2006.01)
(52) U.S. Cl. .................................... 714/755
(58) Field of Classification Search ............... 375/240
See application file for complete search history.

(56) References Cited

U.S. PATENT DOCUMENTS

| | | | |
|---|---|---|---|
| 5,212,549 A | 5/1993 | Hg et al. .................. 358/135 |
| 6,014,766 A | 1/2000 | Nagai et al. ............... 714/764 |
| 6,961,377 B1 * | 11/2005 | Kingsley ............... 375/240.12 |
| 6,978,083 B1 * | 12/2005 | Ando et al. ................... 386/95 |
| 2001/0026677 A1 * | 10/2001 | Chen et al. .................. 386/68 |
| 2003/0219038 A1 * | 11/2003 | Saeijs et al. ................ 370/503 |
| 2004/0136290 A1 * | 7/2004 | Chung et al. ............ 369/47.55 |
| 2005/0105614 A1 * | 5/2005 | Katsavounidis et al. ..... 375/240.06 |
| 2005/0149831 A1 * | 7/2005 | Katsavounidis et al. .... 714/776 |
| 2005/0254584 A1 * | 11/2005 | Kim et al. ............. 375/240.27 |
| 2005/0259954 A1 * | 11/2005 | Ando et al. ................... 386/46 |

FOREIGN PATENT DOCUMENTS

| | | |
|---|---|---|
| EP | 0730385 | 9/1996 |
| EP | 0876062 | 11/1998 |
| GB | 2341509 | 3/2000 |

* cited by examiner

*Primary Examiner*—Albert Decady
*Assistant Examiner*—Sam Rizk (57) ABSTRACT

A method, a device and a system of performing error correction of stream data on a data medium using an information file. The stream data can be AVI, MPEG and stream data with file offset. The data medium can be a DVD+RW, a SVCD or a memory. The method includes the steps of determining (100) whether an error exists in the stream data on the basis of the information file and the stream data; determining (200) a file offset of the error in the stream data on the basis of the information file and the stream data; determining (300) the size of erroneous data in the stream data on the basis of the information file and the stream data; and inserting (400) correction data in stream data. Clock references and characteristic points in the information file are used to link to file offsets in the stream data. Erroneous data is replaced by correction data at the file offset with the correct size. Replaced data can also be a flag or it can be decided to replace with dummy data. The method can be executed during recording or playback of stream data.

19 Claims, 4 Drawing Sheets

ERROR CORRECTION OF STREAM DATA

This invention relates to a method of performing error correction of stream data on a data medium using an information file.

The present invention further relates to a computer system for performing the method.

The present invention further relates to a computer program product for performing the method.

The present invention further relates to a device for performing error correction of stream data on a data medium using an information file.

EP 0876062 discloses an embodiment of a digital recording and playback apparatus with improved error correction capability and a method therefor. EP 0876062 discloses an embodiment of error correction in the recording and playback of MPEG-2 stream signals in a digital video cassette recorder on a digital video tape. The method is implemented in various blocks such as buffers, memory, inner and outer correction coders, etc. to improve the correction of errors of normal play data, without being affected by stuffing data.

It is a problem that during the recording process or before the playback process of a streaming data file sometimes something goes wrong, which causes loss of parts of the streaming data file that can make parts of the streaming data file useless. The loss may take place at a time when the streaming data file is transferred to a data medium such as a Digital Video Disk with read and/or write capabilities (DVD+RW), a Super Video Compact Disk (SVCD) or to a memory.

The problem is solved by a method of performing error correction of stream determining whether an error exists in stream data on the basis of the information file and the stream data;

determining a file offset of the error in the stream data on the basis of the information file and the stream data;

determining the size of erroneous data in the stream data on the basis of the information file and the stream data; and inserting correction data in stream data.

Hereby the problem of loss of parts of streaming data in the recording process or in the playback process of streaming data file is generally solved stepwise in four steps. In the first step it may be determined that the stream data has some error, i.e. data is erroneous and or data is missing.

In the next three steps the information from the information file and the stream data is used to generate and to insert appropriate data content, i.e. correction data (from the fourth step) in place of the lost data. The correction data is inserted at the file offset of the error from the second step and with the correct size from the third step. An application therefore needs to derive information to the information file about the stream data at a time before any data is lost from the streaming data.

The loss of parts of streaming data may have been affected by transmission or network errors, a buffer overflow in or before the streaming recording or playback process, mechanical shocks to the recording device or to the playback device and or corrupt or bad sectors on the data medium, etc. As a result, the length of the streaming data file that is actually recorded on the data medium or stored in the memory to be played has another size than the streaming data file that was meant to be recorded or to be played. This means that after a data loss of parts of streaming data has occurred, file offsets—saved in the information file at the time when the streaming data file was not damaged—and other information containing the temporal relation to when to present or when to decode various frames in the stream data as included in the information file, i.e. information about the stream in the information file is not correct anymore. The inserted correction data of the correct size at the file offset ensures that information about the stream in the information file becomes correct again.

A preferred embodiment of the method is described in claim 2.

In other words, in these three steps the application compares the size of the stream data with the size from the information file in order to see whether the stream data has an error, i.e. some data are lost.

An other preferred embodiment of the method is described in claim 3.

In these two steps the clock reference from the information file and or a characteristic point is used to find the file offset of the error in the stream data.

An other preferred embodiment of the method is described in claim 4.

In these three steps the pair of clock references is used to look up the pair of file offsets to determine the exact size of erroneous data or missing data.

An other preferred embodiment of the method is described in claim 5.

In these three steps correction data in the form of either data content of a predetermined type, or a flag or only dummy data is inserted by the application to replace erroneous data or missing data in the stream data.

An other preferred embodiment is described in claim 6.

In a preferred embodiment, the method is executed during recording of stream data.

By recording, it is meant to put information into buffers, which has to be written physically to a data medium.

In a preferred embodiment, the method is executed during or before playback of stream data.

However, it may also be the case that after several play back's of stream data, it is first then decided to cure the problem of missing data with the said method.

The method is executed by an application, which can record and or play back stream data such as AVI, MPEG or stream data with file offset.

The application can use a data medium such as a DVD+RW, a SVCD or a memory with stream data.

The problem is further solved by a device for performing error correction of stream data on a data medium using an information file comprising:

means for determining whether an error exists in the stream data on the basis of the information file and the stream data;

means for determining a file offset of the error in the stream data on the basis of the information file and the stream data;

means for determining a size of erroneous data in the stream data on the basis of the information file and the stream data; and means for inserting correction data in the stream data.

More detailed embodiments of the device are described in claims 12 to 15.

The device gives the same advantages for the same reasons as described previously in relation to the method.

The following two sections are a short introduction to how MPEG is compressed, encoded and decoded, however it is important at this point to note that the present invention generally applies to stream data with characteristic points and timing information.

When MPEG video stream is compressed, different frames are created in the encoding process. The first stage is to create I frames, so called Intra frames, subsequent frames in a group of frames will be predicted from the I frame. The I frame has all the information necessary later to decode the picture of the video. In order to compress data predicted frames, are predicted from past I or past P frames. B frames, i.e. bi-directional predicted frames, use past and future I and P frames. During the encoding process the encoder will cycle through each frame of the video stream and decide whether to use I, P or B frame (en)coding and how to combine these frames. Roughly for every twelve frames, an I-frame is created. In a signal with many changes, e.g. a movie having pictures with many movements the I frame will be used more frequently during the encoding process and vice versa.

During decoding—the reverse process of encoding—generally the I, P and B frames are used to reconstruct the video stream. However, further timing information in the stream is needed to reconstruct the video stream. DTS, Decode Timing Stamp, tells the decoder when to decode the frame and PTS, Presentation Time Stamp, tells the decoder when to display the frame. The PTS and DTS are added to a so-called PES, Packetised Elementary Stream, while a clock, known as the Programme Clock Reference, PCR, is contained in the so-called Transport Stream. The important features are here the DTS and PTS, which allow the decoding process to reconstruct the video stream from the I, B and P frames sent by the encoder into the correct temporal relation. The I, B and P frames as such have no temporal relation as to when to decode or to display the frame(s).

In recording systems and or playing systems with a file system with streaming data in a preferred embodiment of the invention, information about the stream data is derived and saved in an information file. The information file with information about the stream may comprise file offsets such as start of a chapter, positions of certain frames as an example the I-frames in MPEG stream data, start of certain characteristic point (for example commercials, goals in a football match, etc.). As an example he information may be based on the file offsets in the stream data and may be saved in the information file at the time when the streaming data was not damaged due to a data loss. As an example the information file belonging to a particular data stream may represent a complete movie, and the information file may also be fetched from the Internet from the owner or from the supplier of the movie.

The mentioned data loss may be caused by network or transmissions errors, caused of a buffer overflow, a parity error etc. in the streaming recording or playback process, data loss due to mechanical shocks to the recording device or to the playback device.

The invention will be explained more fully below in connection with preferred embodiments and with reference to the drawings, in which.

Figure 1:
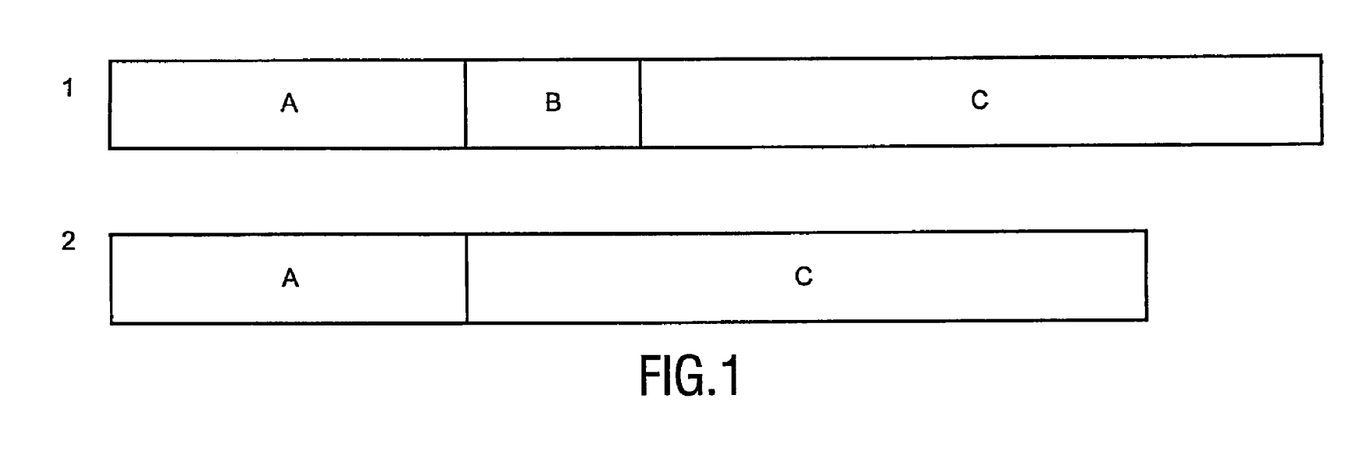
FIG. 1 illustrates how it is attempted to record or to play stream data with loss of data.

FIG. 1 illustrates how it is attempted to record or to play stream data but somewhere in the recording or playing process some stream data are lost. The stream data, reference numeral 1, comprises the parts of stream data as represented by reference numerals A, B and C. Reference numeral A is stream data not affected by any error. However, reference numeral B is the part of stream data affected later by some error with the result that these data may be lost. Reference numeral C is another part of the stream data meant to be recorded or to be played after the sequence of reference numeral A and reference numeral B is recorded and or played. In other words, reference numeral 1 together with A, B and C forms the original stream data that had to be recorded or to be played. However, reference numeral 2 refers to the stream data after recording and or the stream data played in the situation that the loss of reference numeral B, some of the stream data, was not corrected or compensated for. Reference numeral 2 may be stream data on a data medium such as DVD+RW, SVCD and or the data residing in a memory before being played or before being written to the data medium. In other words, only A and C are included on the data medium or in the memory, if no action is taken to correct or to compensate for loss of data.

However, A and C may be on the data medium or in the memory only, when an action is taken to correct or to compensate for loss of data: during the correction for the loss of reference numeral B, it may be decided to go out of the stream data just before a start of a Group Of Pictures (GOP) somewhere in reference numeral A, and to go in the stream data again just before a start of another GOP somewhere in reference numeral C.

Figure 2:
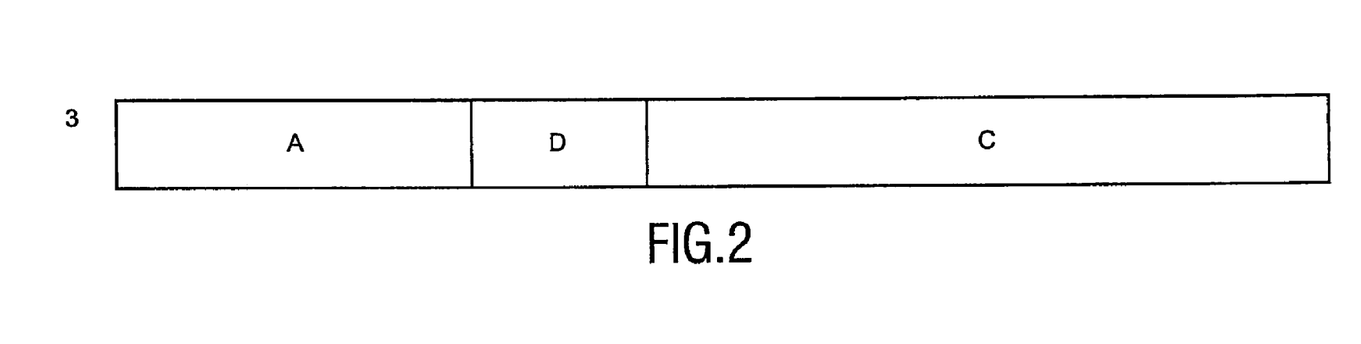
FIG. 2 illustrates how it is attempted to record or to play stream data, when there is a correction or a compensation for the loss of data from FIG. 1.
Figure 3:
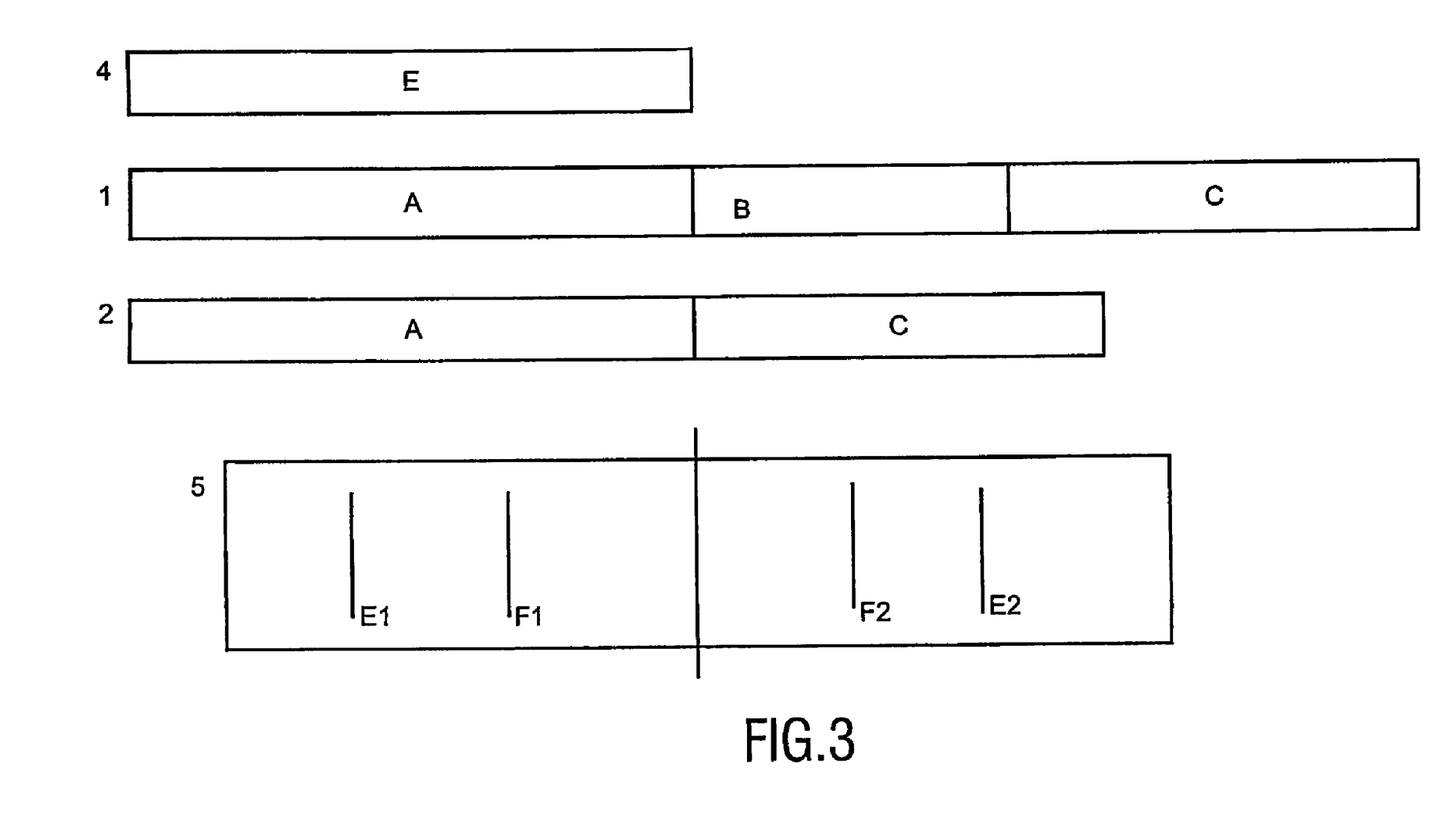
FIG. 3 illustrates an information file and the use of it.

FIG. 2 illustrates how it is attempted to record or to play stream data, and when somewhere in the recording or playing process some stream data are lost, there is a correction or a compensation for the loss. The situation is that it was detected in a preferred embodiment of the invention in the recording or in the playing process that some stream data, reference numeral B of FIG. 1, were lost. Reference numerals A and C have the same meaning as in the foregoing figure. The loss of reference numeral B is here corrected or compensated for as shown in reference numeral D, which is the part of stream data of another content or a flag different from the lost stream data, thereby reference numeral 3 refers to the entire stream data after recording and ready to be played when the loss of reference numeral B have been corrected or compensated for. Reference numeral 3 may be stream data on a data medium such as DVD+RW, SVCD and or the data residing in a memory ready to be played or written to the data medium. In other words, on the data medium or in the memory the parts of stream data A, D and C are all included, when action has been taken to correct or to compensate for the loss of reference numeral B of FIG. 1. It may be the situation that in more positions than indicated in reference numeral B of FIG. 1, stream data is lost, and may correspondingly be replaced with another content of stream data The application running this method may be able to determine that the file length as reported by the file system is not equal to the length of the file as indicated by the information about the stream in the information file. It may also be possible that the application finds out during playback of stream data that something went wrong during the recording of stream data. By analysing the stream data and with the information about the stream from the information file, the application is able to tell exactly where in the stream one or more parts are missing and the size of these parts. However, it may not be necessary to know exactly where, as the method may decide (as will be explained in step 400) to go out of the stream data before the error, and to go in the stream data again at a particular Group Of Picture or to go in the stream data at an I frame or at a P frame. With the information about where in the stream and the said size, the application may then be able to inform the file system about the length and possibly the content that should replace part B of FIG. 1. Reference numeral D may be data content of a predetermined type, a flag or nothing that replaces part B, reference numeral of the original stream data from the foregoing Figure. The flag may be recognized by the application during decoding, recording or playback to apply a specific data content of a predetermined type that results in a black screen or a freeze of the video picture or a mute in the audio signal, etc. As mentioned, it may be possible for the method of the application to for reference numeral D. The possibility may exist that there is already a data content of a predetermined type ready to replace part B of the original stream data as a result of a previous analysis of the stream data FIG. 3 illustrates an information file and the use of it. In a preferred embodiment of the invention the information file may have the use and the content shown in the following. Reference numerals A, B, C, and 1 have the same meaning as in the two foregoing figures. Reference numeral 4 shows the information file mentioned in the foregoing with a content of reference numeral E. Reference numeral 5 is an enlarged view of the content E of the information file. The focus will be on two issues in the following: how the file offset of the error in the stream data is determined and how the size of the erroneous data in the stream data is determined. This is done for the case of stream data representing a MPEG2 movie. The idea of the invention is not limited to stream data representing MPEG2 or MPEG movies. The problem of missing stream data with characteristic points in the data stream may be solved by the invention when the application has or can have access to an information file such as reference numeral 4 that comprises a link between these characteristic points and a file offset in the stream data. The information file may further comprise relations between clock references and file offsets. By way of example the characteristic points in the stream data may be start of a chapter, positions of I frames, start of certain points such as commercials, all the goals in a football match, etc. Another example of a file or stream data with similar or like characteristic points, may be an AVI file with video and or audio information. A discontinuity in the stream data, i.e. part of stream data may have been lost or corrupted, may be noticed when the application parses through the information file and compares this information with information about the stream data. The application may parse through the information file just to assure that the stream data have no missing data. In any case the application has to parse through the information file and the stream data to determine the status of the stream data: one or more parts of the stream data is missing or is corrupted or the stream data is free from any error. The information file may be present on a disc or on another medium or may be present in the memory. The information file may already be present as it was used earlier for another correction of lost data. As stated previously the information file may have been downloaded from the Internet, as it was determined that there was a need for using the file to correct or to compensate for lost data. By parsing through the information file, the application may look at the PCR, Program Clock Program Stream, the application may look at the SCR, System Clock Reference. Reference numerals F1 and F2 show sets of Program Clock Reference or System Clock Reference, hereafter referenced with the corresponding names PCR1, PCR2 and SCR1, SCR2. It may also be possible for the application to look at other time indicators or clock references in the information file in that may have been added to the MPEG packets and or to the information file while recording the stream data to a disc, to a memory or to another medium. An example of this is APAT, Application Packet Arrival Time that have been defined by Philips Electronics for the DVR system.

In the case where the application only knows that there is a discontinuity in the stream data when parsing through the information file, it may determine that stream data is lost somewhere between two Program Clock References, PCR1 and PCR2 or somewhere between two System Clock References, SCR1 and SCR2.

To avoid having halves of MPEG frames in the stream, all data between PCR1 and PCR2 or all data between SCR1 and SCR2 may be thrown away. In other words, in such a case the application may decide not to insert correction data in the place of lost data Further, it may be decided to go out of the stream data just before a start of a GOP, i.e. a Group Of Pictures, and to go in the stream just before a start of another GOP, or to go in the stream just before an I frame or a P frame. Generally, it is important to consider the frames and or the GOP, in the decision where to go in and where to go out of the stream data.

It is important to note that in the information file, the link between the file offsets of the stream data (for stream data not affected by any error) and the PCR time is given and or the link between the file offsets of the stream data and the SCR time is given. Generally, the information file may have links between a number of file offsets—for stream data not affected by any error—and a corresponding number of clock references, which may comprise the temporal relation to when the stream data at the file offset should be decoded and or displayed.

When the application knows the set of Program Clock References, such as PCR1 and PCR2, or the set of System Clock References, such as SCR1 and SCR2 from the stream data, the length of the file part of the stream data that is missing can thereby be analysing these two file offsets, the size of the erroneous data in the stream data is determined. Generally, in the information file a determined pair of clock references is used to look up a corresponding pair of file offsets to compute the size of lost or erroneous data in the stream data.

Reference numerals E1 and E2 show sets of PTS, Presentation Time Stamp, or DTS, Decode Time Stamp. From the Presentation Time Stamp or the Decode Time Stamp known in the prior art when discussing television or MPEG picture frames, and with the known refresh rate of pictures, 50 Hz in Europe generally, that is 40 ms frame, it may also be possible to determine the number of frames that is missing in the stream data, and hereby another measure of the size of the missing data is given.

Continuing the example, as it was previously determined that stream data was lost between two Program Clock References or between two System Clock References, and that the information file has links between the file offsets and the PCR time, and or has links between the file offsets and the SCR time, it is therefore possible to determine the file offset of the error in the stream data. When reference numeral E1, which is the first one in the set of the two pairs of said Clock References (PTS or DTS, respectively) links from the information file to the file offset in the stream data, the position of the error in the stream data may be hereby be determined exactly.

With the determined information about the file offset of the error in the stream data and with the determined size of the erroneous data in the stream data, it is hereafter possible to insert correction data in the place of the lost data. The correction data may be data content of a predetermined type having the size to be inserted at the determined file offset in the stream data. The correction data may be as simple as a flag to be inserted at the determined file offset in the stream data. When inserting data content of a predetermined type, the application has to make sure that the exact number, length and or type of the various frames are properly inserted. It may also be possible to add empty P frames, and further to use padding bytes, that is other dummy bytes which may be inserted in a frame in order to get a proper alignment of the entire inserted data content.

Figure 4:
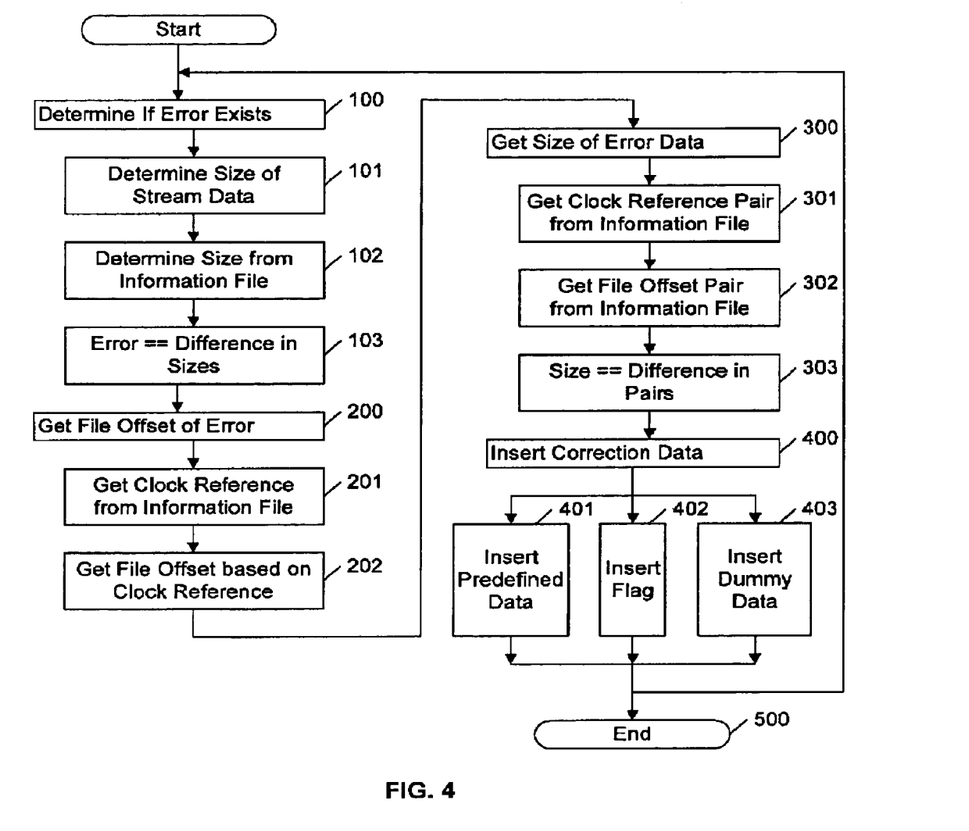
FIG. 4 illustrates a method of error correction.

FIG. 4 illustrates a method of error correction. In step 99, the method is various items of information of a file may be retrieved such as the length of a file, the size of the file. The retrieval of such information is known form prior art operating systems such as the Dos and the Windows operating systems. Variables, flags, etc. are set to default values. In this step it may be appropriate to have the information file available, as it may be so that the error correction need to be executed during recording and or during playback of stream data. The information file may be present on a disc or on another medium or may be present in the memory. The information file may already be present as it was used earlier for another correction of lost data The information file may have been downloaded from the Internet or supplied on a computer readable medium.

In step 100, it is determined whether an error exists in the stream data on the basis of the information file and the stream data Step 100 forms the generalisation of the steps 101, 102 and 103.

However, apart from these steps, it may also be possible for the file system or the recording device to find out whether an error exists in the stream data during the recording process, it may parse through the stream data and at the same time be monitoring a time-base and thereby conclude that there is an error in the stream data.

In step 101, a first size of the stream data on the basis of the stream data is determined. Here the stream data is examined by the application to determine how long the stream is, i.e. a first size of the stream data is determined for the entire stream. The stream data may either be the stream data with no data lost such as reference numerals A, B and C of FIG. 1, or the stream data may have been affected by a data loss such as part B of FIG. 1 leaving reference numerals A and C.

In step 102, a second size from the information file is determined. The information file comprises information about the stream data at the time where the stream data was complete, i.e. not affected by any data loss or corrupted data. From the information file another size, a second size, i.e. the correct size of an error free stream data, is retrieved.

In step 103, the error is determined, when the first and second sizes are not equal. It is determined from a comparison of the determined sizes from the steps 101 and 102 the stream data is incomplete, i.e. the first and the second sizes differ. When they differ, it is most likely that an error has occurred somewhere in the stream data, i.e. somewhere in the streaming data part or parts are lost. The loss of a part or part of streaming data may have been affected by transmission or network errors, a buffer overflow in the streaming recording or playback process, mechanical shocks to the recording device or the playback device and or corrupt or bad sectors on a recording medium, in a memory, etc. As a result, the length of the streaming data file that is actually recorded on the recording medium or stored in the memory to be played, i.e. the determined first size from step 101, has another size, i.e. the determined second size from step 102, than the file that was meant to be recorded or to be played.

In step 200, a file offset of the error in the stream data on the basis of the information file and the stream data is determined. Step 200 forms the generalisation of the steps 201 and 202.

In step 201, a clock reference or a characteristic point in the information file is determined. It may be revealed that a part of the stream data may have been lost when the application parses through the information file and compares this information with information about the stream data. By parsing through the information file, the application may look at the PCR, Program Clock Reference, in case the stream data is a Transport Stream, or at the SCR, System Clock Reference, when the stream data is a Program Stream. It may also be possible for the application to look in the information file for other time indicators or clock references that may have been added to the MPEG packets, and or to the information file while recording the stream data to a disc, to a memory or to another medium. Another example of a clock reference may be the APAT, Application Packet Arrival Time, that have been defined by Philips Electronics for the DVR system. In the case above when the application only knows that there is a discontinuity in the stream data when parsing through the information file, it may determine that stream data is lost between two Program Clock References, or between two System Clock References or between two Application Packet Arrival Time—Clock References. The application will therefore select the first of the said two Clock References when the particular clock reference in the information file is determined. In order to correct data later in the method, the application has to start the correction from a point where the stream data is not affected by any error, i.e. from the file offset referred to from the said first Clock Reference.

In step 202, the file offset in the information file on the basis of the determined clock reference and or on the basis if the determined characteristic point may be looked up. As stated previously the information file comprises links between the file offset of the stream data (for stream data not affected by any error) and the clock references. The information file also comprises links between the file offset of the stream data and characteristic points.

From the said first Clock Reference of step 201, i.e. the determined clock reference, or from the determined characteristic point, the corresponding file offset in the information file is looked up. Thereby the application may now know the file offset of the stream data prior to the error, and thereby the application may also know that the error is between the determined file offset and the next file offset.

In step 300, a size of erroneous data in the stream data on the basis of the information file and the stream data may be determined. Step 300 forms the generalisation of the steps 301, 302 and 303.

In step 301, a pair of clock references in the information file may be determined. As explained in step 201, the application may determine when parsing through the information file and at the same time analysing the stream data having an error somewhere that data was lost between two Clock References. Hereby the pair of clock references may be determined as the said two Clock References.

In step 302, a pair of file offsets in the information file on the basis of the determined pair of clock references may be looked up. The information file may generally have a link between any file offset and any clock reference. Thereby, by looking in the information file the application may find a pair of file offsets from the pair of clock references from step 301.

In step 303, the size of erroneous data on the basis of the combination of the pair of file offsets looked-up and the determined pair of clock references may be determined. As an example, the clock reference may be the type of Presentation Time Stamp that tells the decoder when to display a frame. When a pair of clock references is known, a difference of the pair of clock reference may be computed which may represent the duration of erroneous or missing data. The pair of determined file offsets from the foregoing step may be a part of the computation to verify or to fine-tune the size of erroneous data to replace.

In step 400, correction data may be inserted in the stream data Generally, in step 400 another data content in the place of lost or erroneous data is inserted. The step 400 forms the generalisation of the steps 401, 402 and 403. However, the application may decide only to perform one of the steps 401, 402 and 403 in step 400, as these three steps are alternatives to what may be done to replace the lost data. As previously mentioned, when considering correction or to insert correction data in this step, the application may decide not to insert correction data in the place of lost data. It may be decided to go out of the stream data just before a start of a GOP, and to go in the stream again just before a start of another GOP, or to go in the stream just before an I frame or a P frame. This means, that the correction data may have the following effect during play back: go out of the stream data somewhere in reference numeral A, and go in again in the stream data somewhere in reference numeral C.

In step 401, the data content of a predetermined type having the determined size at the determined file offset may be inserted. The application may choose between different alternative data contents to find the best data content, i.e. the solution that conceals in the most appropriate way that data was lost in the stream data. In this decision the application may further consider which data content, i.e. reference numeral D of FIG. 2 may ensure in the best way that recorded or played back stream data of the choice is synchronized as early as possible with the following stream data, i.e. reference numeral C of FIG. 2, during encoding of the stream data. The chosen data content with the correct size (from step 300), i.e. data content of a predetermined type, may be inserted at the determined file offset (from step 200). The predetermined type of the data content may comprise part of stream data representing a muted audio signal, representing a frozen picture or representing a black screen.

In step 402, a flag at the determined file offset may be inserted. As an alternative to step 401, a flag may be inserted. The flag may comprise fewer data than the data inserted in the foregoing step. On the contrary, the flay may also comprise information about the size of missing data. The flag may be used in a simple way to inform the stream data that some particular action has to be taken when the flag is met. The action may be to skip a certain part of following stream data and or to jump to another file offset (it may be to a characteristic point) in the encoding of the stream data. The flag may also be interpreted as a muted audio signal or be interpreted as a frozen picture or be interpreted to present a coloured screen, all of these with a predetermined duration. The flag may trig the application during decoding that it may receive non-valid data in the following (with the size), the application may then to something appropriate such as putting the decoder in a "repeat last frame mode", etc.

However, it is important to notice that even when merely a flag is inserted, data content of correct size still have to be inserted at the offset, i.e. after the flag, dummy frames or the like may have to be inserted to reach the correct size.

In step 403, dummy data may be inserted at the determined file offset. As an alternative to step 401 or as an alternative to step 402, the application may decide not to insert important correction data, but only to insert dummy data. The solution with only dummy data may be the most appropriate way to conceal that data were lost in the stream data. The two alternatives, i.e. the steps 401 and step 402, may worsen the problem in that artefacts may be generated in these steps that may give the user a bad experience when inserted stream data from any of from these steps is played back. Further, the step 403 may ensure that the played back stream data (at the point of the detected error with lost data) is synchronized as early as possible with the following remaining stream data. In other words, even though it was determined that some part of stream data were lost, the best solution may be to do only a minor thing, i.e. to leave the stream as unchanged as possible. However, data content of the correct size, but of an unimportant meaning (dummy data) during playback, still has to be inserted at the offset, i.e. dummy frames or the like may have to be inserted to reach the correct size.

The application may further decide to avoid ending up with half MPEG frames in the stream data, and all data between two clock references may therefore be thrown away and may not be replaced by another data content. The application may decide not insert correction data or dummy in the place of the lost data. The application may consider that it is better not to insert any data, as the error of the stream data is very minor, i.e. it may only be decoded shortly after the error; synchronization is therefore quickly ensured with the following stream data.

Normally, the method will start from the beginning again, preferably as long as the system wherein the method is running is powered. Otherwise, the method may terminate in step 500; however when the system is powered again, the method may proceed from step 100 again.

It may be possible that there are multiple bad spots in the stream data file, i.e. multiple places in the stream data where data is missing. By parsing through the stream data and the information file, the bad spots may be found. This invention can be useful in applications using stream data like e.g. DVD+RW or SVCD. In a single system where the method is running it may be possible to generate the information file, i.e. information about the stream data in close contact with the recording process. In that way the information about the stream data can be adjusted immediately if the application notices that something went wrong in the recording process.

Figure 5:
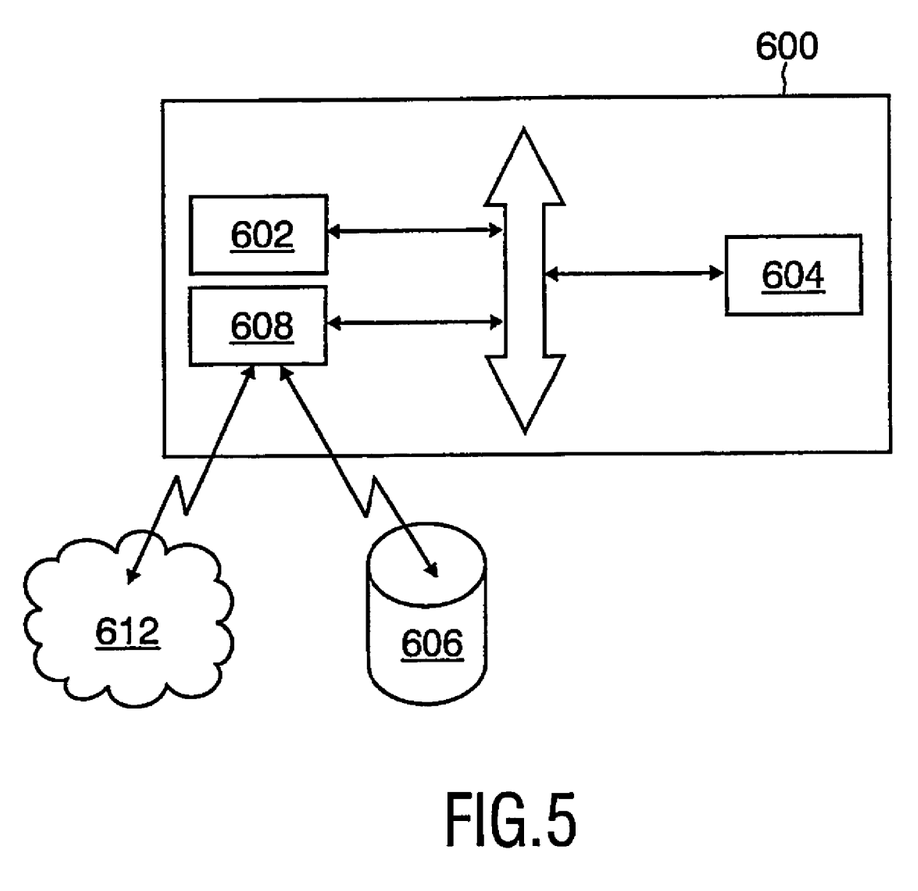
FIG. 5 illustrates an embodiment of a device according to the invention in a schematic way.

FIG. 5 illustrates an embodiment of the device according to the invention in a schematic way. The device 600 is a DVD recorder. It can also be any other device capable to stream a data file to a data medium like a DVD+RW, SVCD, a memory, CD, floppy etc. The device 600 comprises a general memory 602, a driver memory 608, a central processing unit 604, a software bus 610 and is connected to a data medium 606 and a broad cast station 612. The general memory 602 comprises computer readable code designed to perform embodiments of the method according to the invention. The general memory 602, the driver memory 608 and the cpu 604 are connected to each other through software bus 610. The driver memory 608 comprises computer readable code that is designed to receive a data stream from, for example, a broad cast station 612 through, for example, cable or satellite connection. Further the driver memory 608 comprises computer readable code that is designed to read and/or write a data stream from and/or to the data medium 606 like a DVD.

A computer readable medium may be magnetic tape, optical disc, digital video disk (DVD), compact disc (CD record-able or CD write-able), mini-disc, hard disk, floppy disk, smart card, PCMCIA card, etc.

The invention claimed is:

1. A method comprising:
   determining whether an error exists in stream data based on the stream data and an information file associated with the stream data;
   determining a file offset of the error in the stream data based on the information file;
   determining a size of erroneous data in the stream data based on the information file; and
   inserting correction data in the stream data based on the file offset and the size of the erroneous data.

2. The method of claim 1, wherein determining whether the error exists in the stream data includes:
   determining a first size of the stream data based on the stream data,
   determining a second size from the information file; and
   determining the error, when the first and second sizes are not equal.

3. The method of claim 1, wherein determining the file offset of the error in the stream data includes:
   determining a clock reference or a characteristic point in the information file; and
   looking up the file offset in the information file based on determined clock reference or the determined characteristic point.

4. The method of claim 1, wherein determining the size of erroneous data in the stream data includes:
   determining a pair of clock references in the information file;
   looking up a pair of file offsets in the information file based on the determined pair of clock references; and
   determining the size of erroneous data based on the combination of the pair of file offsets looked-up and the determined pair of clock references.

5. The method of claim 1, wherein inserting correction data in the stream data includes at least one of:
   inserting data content of a predetermined type having the determined size at the determined file offset;
   inserting a flag at the determined file offset; and
   inserting dummy data at the determined file offset.

6. The method of claim 5, wherein the data content of predetermined type includes at least one of: part of the stream data representing a muted audio signal, data representing a frozen picture, and data representing a black screen.

7. The method of claim 1, wherein the method is executed during recording of stream data.

8. The method of claim 1, wherein the method is executed during or before playback of stream data.

9. A computer program stored on a computer readable medium that includes computer code that when executed by a processing system, causes the system to:
   determine whether an error exists in stream data based on the stream data and an information file associated with the stream data;
   determine a file offset of the error in the stream data based on the information file;
   determine a size of erroneous data in the stream data based on the information file; and
   insert correction data in the stream-data based on the 5le offset and the size of the erroneous data.

10. A computer program that includes computer code that when executed by a processing system, causes the system to:
    determine whether an error exists in stream data based on the stream data and an information file associated with the stream data;
    determine a file offset of the error in the stream data based on the information file;
    determine a size of erroneous data in the stream data based on the information file;
    insert correction data in the stream data based on the file offset and the size of the erroneous data.

11. The computer program of claim 9, wherein determining whether the error exists in the stream data includes:
    determining a first size of the stream data based on the stream data;
    determining a second size from the information file; and
    determining the error, when the first and second sizes are not equal.

12. The computer program of claim 9, wherein determining the file offset of the error in the stream data includes:
    determining a clock reference or a characteristic point in the information file; and
    looking up the file offset in the information file based on the determined clock reference or the determined characteristic point.

13. The computer program of claim 9, wherein determining the size of erroneous data in the stream data includes:
    determining a pair of clock references in the information file;
    looking up a pair of file offsets in the information file based on the determined pair of clock references; and
    determining the size of erroneous data based on the combination of the pair of file offsets looked-up and the determined pair of clock references.

14. The computer program of claim 9, wherein inserting correction data in the stream data includes at least one of:
    inserting data content of a predetermined type having the determined size at the determined file offset;
    inserting a flag at the determined file offset; and
    inserting dummy data at the determined file offset.

15. The computer program of claim 14, wherein the data content of predetermined type includes at least one of: part of the stream data representing a muted audio signal, data representing a frozen picture, and data representing a black screen.

16. A device comprising:
    means for determining whether an error exists in stream data based on the stream data and an information filed associated with the stream data;
    means for determining a file offset of the error in the stream data based on the information file;
    means for determining a size of erroneous data in the stream data based on the information file; and
    means for inserting correction data in the stream data.

17. The device of claim 16, wherein the means for determining whether the error exists in the stream data includes:
    means for determining a first size of the stream data based on the stream data;
    means for determining a second size from the information file; and
    means for determining the error, when the first and second sizes are not equal.

18. The device of claim 16, wherein the means for determining the file offset of the error in the stream data includes:

means for determining a clock reference or a characteristic point in the information file; and     means for looking up the file offset in the information file based on the determined clock reference or the determined characteristic point.

19. The device of claim 16, wherein the means for determining the size of erroneous data in the stream data includes:

means for determining a pair of clock references in the information file;

means for looking up a pair of file offsets in the information file based on the determined pair of clock references; and     means for determining the size of erroneous data based on the combination of the pair of file offsets looked-up and the determined pair of clock references.

* * * * *